Patented Aug. 21, 1945

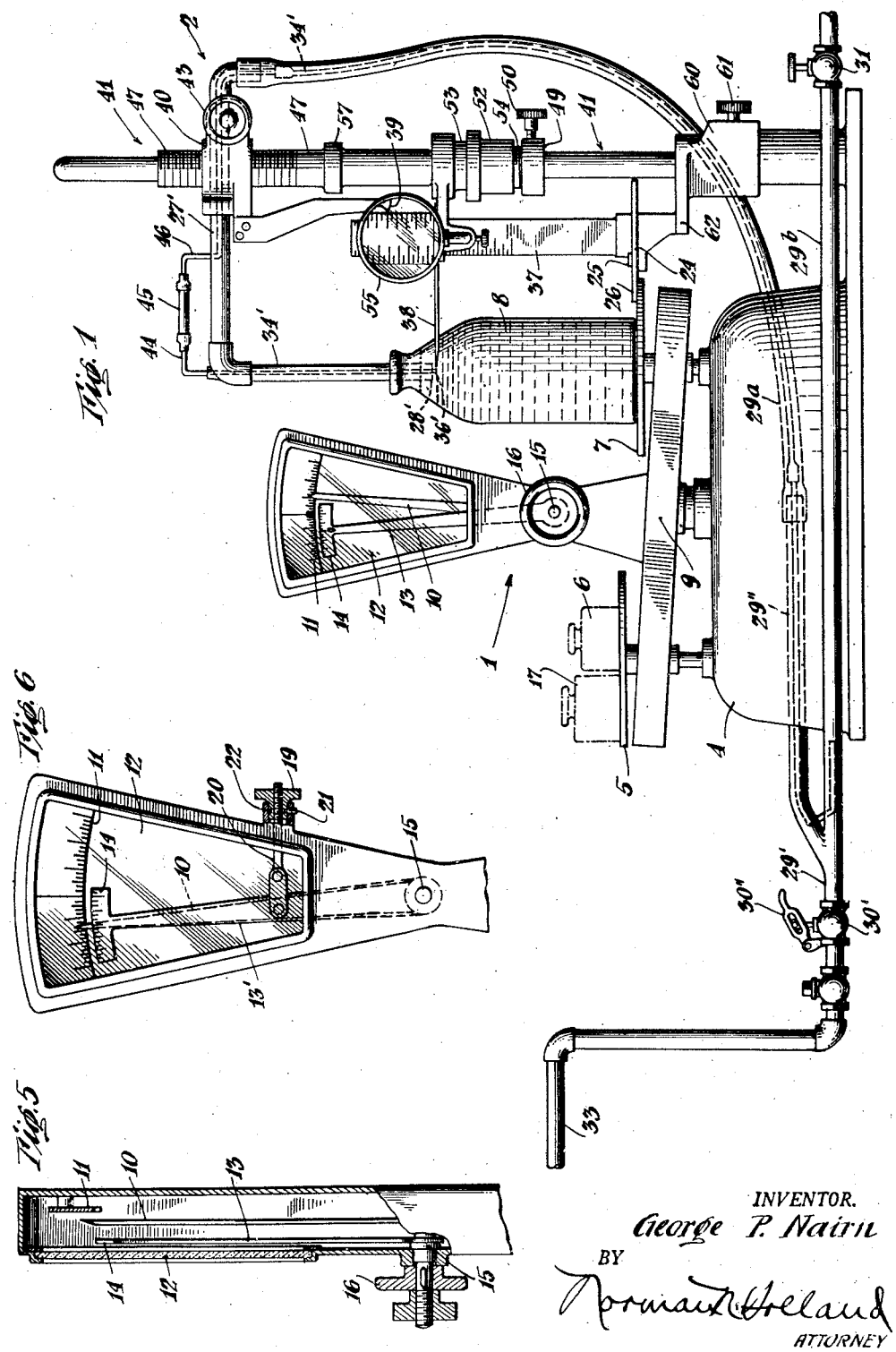

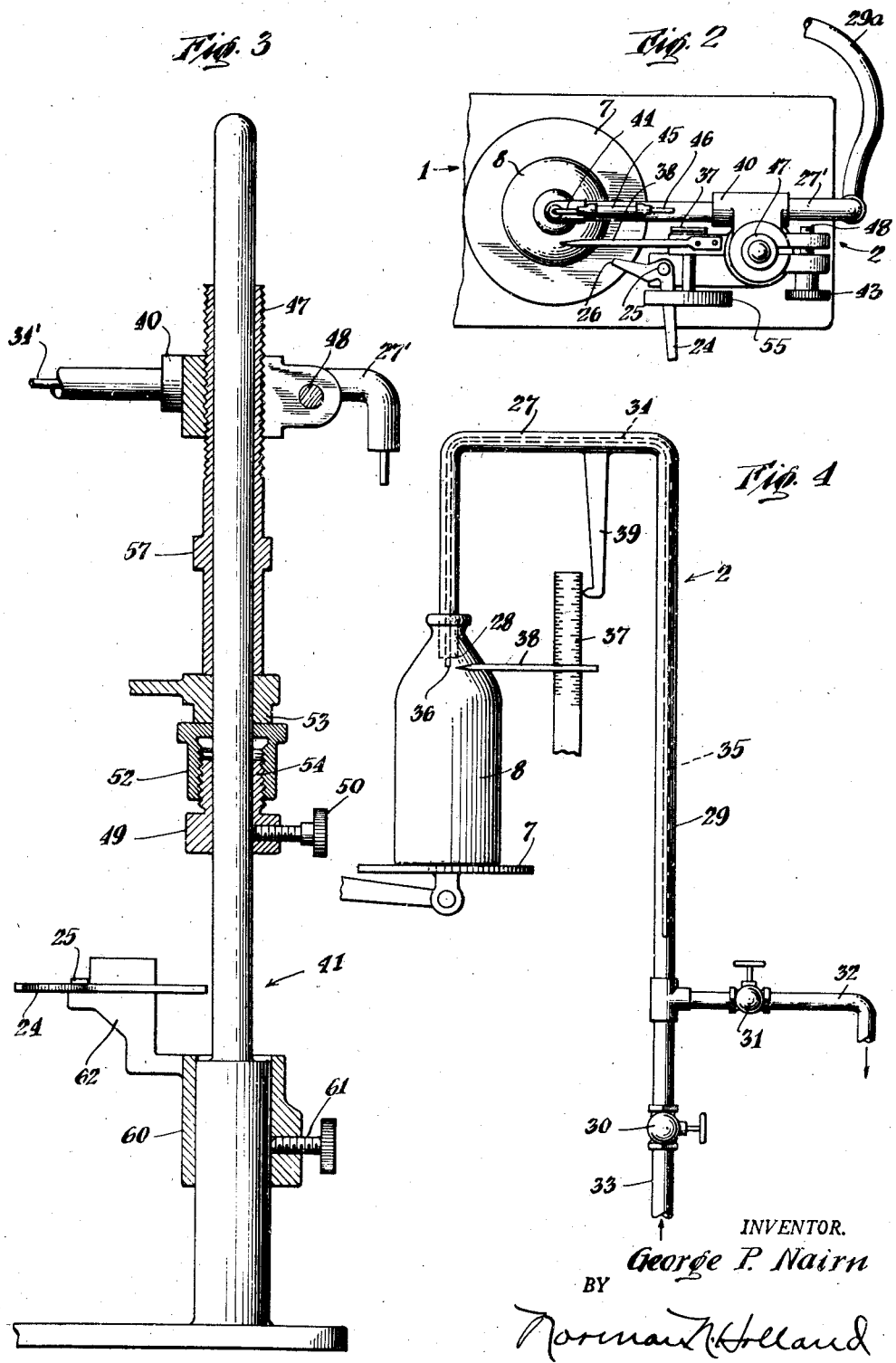

2,383,269

UNITED STATES PATENT OFFICE 2,383,269

WEIGHT AND CAPACITY TESTING DEVICE

George P. Nairn, Salem, N. J., assignor to Anchor Hocking Glass Corporation, Lancaster, Ohio, a corporation of Delaware Application January 29, 1943, Serial No. 474,021

12 Claims. (Cl. 73—149)

The present invention relates to testing devices and more particularly to a device for testing the weight and capacity of containers.

In the manufacture of glass containers, it is necessary that they conform to predetermined standards within allowable tolerances. Such containers are filled by automatic machinery delivering predetermined amounts during each filling operation. If the container is undersize, it is filled too full; if it is oversize, it is not filled full. In the former case, the container may overflow or impair the seal; in the latter case, the consumer purchasing the package thinks the packer is giving short measure and thus the good will of the consumer is lost. For these reasons, packers insist upon rigid specifications and glass manufacturers have to comply with them. In order to do this, glass manufacturers test the capacity of individual containers delivered by glass machines periodically and at the same time, they determine if too much or too little glass is being used in the manufacture thereof. If there is too much glass used in the container, it is usually under capacity; in addition, glass is being wasted. If there is too little glass in the container, the strength is impaired and the capacity is usually too high. In view of the large number of containers tested daily, the time required in the testing operation should be reduced as much as possible. At the same time, accurate measurements must be obtained. The testing is usually done by first weighing the container, then filling it to a predetermined height with water and thereafter weighing the filled container. The filling has to be accurate. In addition, the weighing is complicated because the weight of the container has to be recorded in avoirdupois ounces while the contents are measured in fluid ounces. Hence the difference between the fluid weight of the filled container and the avoirdupois weight of the empty container is not the fluid contents.

The present invention provides a mechanism which simplifies the above testing operations and reduces the time required to perform them. In addition, the mechanism increases the accuracy of the measurements and minimizes the possibility of errors therein.

An object of the present invention is to provide a simple device for testing the weight and capacity of containers.

Another object of the invention is to reduce the time required in testing the weight and capacity of containers.

Another object of the present invention is to increase the accuracy in measuring the weight and capacity of containers.

Another object of the invention is to reduce the possibility of error in measuring the weight and capacity of containers.

Another object of the invention is to provide a weighing mechanism adapted to facilitate obtaining the avoirdupois weight of the container and the fluid contents.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a side elevational view of a preferred embodiment of the device;

Fig. 2 is a fragmentary top plan view of the device illustrated in Fig. 1;

Fig. 3 is a fragmentary sectional view through a portion of the device;

Fig. 4 is a diagrammatic view illustrating the device and method;

Fig. 5 is a sectional view through the dial portion of a preferred embodiment of weighing means; and Fig. 6 is a front view of the dial of a modified form of weighing means.

Referring again to the drawings and more particularly to Fig. 1 thereof, there is shown a preferred embodiment of the invention. The device comprises the combination of two mechanisms; one a weighing device 1, here shown as a platform balance, and a bottle filling device 2 for filling the bottle to a predetermined height while the platform of the balance is locked in position.

Describing first the platform balance or scale 1, there is shown a base 4 having a platform 5 for holding weights 6 and 17 on one side and a platform 7 on the other for holding a bottle 8. The platform is pivotally balanced at the center 9 by a knife edge (not shown) and has a pointer 10 extending upwardly to a scale 11. A suitable glass panel 12 extends over the pointer and scale to enclose them and to permit the reading of the weight in the usual manner. The weight 6 on the platform 5 gives the weight of the bottle 8 if the pointer registers zero on the scale 11. The scale 11 is marked in fractions of ounces and the reading of the pointer thereon has to be added to or subtracted from the weight on the platform balance 5 depending upon whether the bottle is heavier than the weight or lighter. Weighing devices of this general type are known in the art. The present improvement thereon relates to the means for weighing the liquid in the bottle and will now be described.

The empty bottle is weighed in the usual manner, the weight 6 on the platform 5 being in avoirdupois ounces and the scale 11 being in fractions of avoirdupois ounces. After the bottle is weighed, it is filled to a predetermined height and weighed again to determine the amount of liquid in it. The object of weighing the liquid is to obtain its volume in fluid ounces. In order to attain this objective in a simple manner, the preferred embodiment of the invention provides a movable scale 14 carried by an arm 13 mounted on a pin 15 keyed to a knob 16 so that the scale 14 may be oscillated about its pivot by the knob 16. When the pointer 10 comes to rest with an empty bottle on the scale, the scale 14 is moved by the knob 16 until the zero portion of this scale registers with the pointer 10. Hence, the reading on the scale 14 is zero, although the reading on the scale 11 is usually plus or minus some fraction of an avoirdupois ounce. To further facilitate the weighing operation, the graduations on the scale 14 show the volume in fractions of fluid ounces of the fluid being weighed. After a bottle is filled to the proper height, a suitable weight 17 in fluid ounce units is placed on the platform 5 of the balance and the filled container is substantially counterbalanced. Then, the reading of the pointer on the scale 14 is added to or subtracted from the ounces represented by the weight 17 on the balance, depending on whether the filled bottle is heavier or lighter than the weight, and thus gives the weight of the water in the bottle in fluid ounces. Thus the movable scale 14 may be readily utilized as a zero reading for the pointer which eliminates entirely any calculations involving both fluid and avoirdupois ounces. The bottle is weighed in the usual manner and the liquid in the bottle is weighed independently but read in fluid ounces as though the container were a part of the scales. This greatly facilitates the weighing operations, reduces the time required and minimizes the possibility of error.

A modified means for mounting and adjusting the movable scale 14 is shown in Fig. 6. Instead of utilizing a knob such as the knob 16 at the pivot point of the arm 13 as shown at Fig. 5, a knob 19 (Fig. 6) on the side of the scale is threaded to a link 20 attached to the arm 13' so that the arm and the scale 14 may be moved into zero position with respect to the pointer 10. The knob 19 is held in position by a set screw 21 which fits into an annular channel 22. In Fig. 6, the movable scale 14 is shown adjusted to zero position with respect to the weight pointer 10, which is its proper position at the completion of weighing the empty container. The principle of operation of the weighing mechanism is the same as the preferred embodiment, except that the means of adjustment of the auxiliary fluid scale 14 is differently located.

In addition to the improved mechanism for facilitating the weighing of the bottle and of the fluid in the bottle described above, the invention provides improved means for filling the bottle with liquid to a predetermined height. After the empty bottle has been weighed as described above, the platform 7 is pressed down and a latch member 24 is turned about its pivot 25 to engage and hold the platform down in a predetermined position as shown at 26 (Fig. 1).

The filling mechanism, apart from the improved means of adjusting it at its proper level in the bottle, is shown diagrammatically in Fig. 4. A tube or pipe 27 has one end 28 extending downwardly into the bottle and the other end 29 connected through a valve 30 to a suitable source of water supply such as a city tap and also connected through a valve 31 to a pipe 32 leading to a suitable drain. Within the pipe 27 is a smaller pipe 34 which likewise extends into the neck of the bottle and extends downwardly a slight distance below the lower end 28 of the main pipe 27 as shown at 36. The purpose of this will be described later. The other end 35 of the small pipe extends downwardly on the outside of the bottle well below the liquid level in the bottle 8, as shown in Fig. 4.

A suitable scale 37 is provided having a reading on one side for a pointer 38 carried on a sleeve 53 and extending across the neck of the bottle and a reading on the other side for a pointer 39 extending downwardly from the pipe 27. The pointer 38 is set for the proper height of liquid in the bottle and will give a visual indication of whether or not the height of the liquid in the bottle is correct. In filling the bottle, the end 28 of the pipe 27 is placed in the neck of the bottle until the end 36 of the small pipe 34 therein is at the predetermined level of liquid desired in the bottle. The pointer 39 gives on the scale 37 the height of the pipe end 36 above the bottom of the bottle. Having positioned the pipe in place, the valve 30 is opened slightly and liquid is forced through the large pipe 27 and the small pipe 34 into the bottle until the level is above the end 28 of the pipe 27, whereupon, the valve 30 is closed. The valve 31 to the drain is then opened or preferably, is permitted to remain open slightly during the filling in order to be immediately effective when the valve 30 is closed, and since the level of drainage of the pipe 32 is below the level of the liquid in the bottle the pipe 27 and also the pipe 36 become a siphon and continue to act as a siphon until the level of the liquid in the bottle is below the ends of the respective pipes. Hence, the excess liquid in the bottle is quickly reduced by the siphon action of the large pipe 27 which ceases to function as a siphon when the level of the liquid gets below the end 28 thereof. The small pipe 36, as pointed out above, extends slightly below the end 28 of the pipe 27 and continues to act as a siphon until the level of the liquid reaches its lower end 36. By having the smaller pipe for removing the last part of the liquid and for determining the upper level, greater accuracy is achieved. The flow through the large pipe is so rapid that the level would vary considerably if it were relied upon to establish the liquid level in the bottle. However, with the small pipe, the flow is slower and the level of the resulting liquid corresponds quite accurately to the level of the end 36 of the small pipe. The combined large and small pipes give both accuracy and speed in filling the bottle and in removing the excess liquid. In the preferred practice, the valve 31 leading to the drain is left open slightly so that when the valve 30 leading to the water supply is closed the siphon action begins immediately. During the supply of liquid the amount that passes through the valve 31 by reason of its being open slightly is too small to be important.

The piping shown in the preferred embodiment illustrated in Fig. 1 is the same in principle as that illustrated diagrammatically in Fig. 4. The water is supplied from a pipe 33 through valve 30' and pipe 29'. An automatic closing, lever operated valve 30' having a lever 30'' controls the flow of liquid through the pipe so that the lever 30'' may be pressed down to turn on the water quickly and may be released to shut it off. The water passes along pipe 29', branch pipe 29'' and hose 29a which is connected thereto and to pipe 27'. The latter passes through a sleeve 40 attached to pedestal 41 and has its end 28' extending downwardly into the bottle as shown in Figs. 1 and 4 and as described with respect to Fig. 4. A small pipe 34' passes centrally through the large pipe and is extended outside of the pipe as shown at 44 with a glass tube connection 45 to a branch 46 leading back into the main pipe. The small pipe 34' continues through the rubber tube 29a terminating in the drain pipe 29b. The purpose of having the glass tube 45 connected with the small pipe is to have a visual indication of the stoppage of the flow of water through the small pipe so that the operator knows when the operation of the siphon is completed and when the liquid is at the proper level in the bottle for weighing.

It is desirable that ends 28 and 36 of the pipes be movable vertically for removal of a tested bottle from the platform 7 and the replacement of another bottle for testing. To minimize the time required for this operation, the sleeve 40 which supports the filling pipes is bifurcated to extend about a second sleeve 47 (Figs. 1 and 3) and may be secured thereto, by a screw 48 operated by knob 43, at any desired height on the sleeve 47. The sleeve 47 extends about the pedestal 41 and rests upon the pointer sleeve 53 which in turn rests upon sleeve 49 fixed to the pedestal 41 by means of a set screw 50. A screw member 52 is threaded to a threaded part 54 on the sleeve 49 for supporting the sleeves 47 and 53. The three sleeves 47, 49 and 53 may be moved upwardly or downwardly along the pedestal 41 by releasing the set screw 50. This forms a convenient means for adjusting the mechanism quickly for a different height bottle. Thereafter, slight adjustments may be made by the rotation of the member 52 to raise and lower the pointer 38 and the sleeve 47 together with the pipes secured thereto. This raising operation will increase the height of both the pointer 38 secured to sleeve 53 and the pointer 39 secured to sleeve 40. In other words, rotation of the member 52 gives a vernier adjustment for raising and lowering the parts with respect to the pedestal 41. The liquid height for the bottle may be read by the pointer 38 on scale 37 and the height of end 36' of pipe 34' by pointer 39 likewise on the scale 37. As a further convenience, a reading glass 55 is mounted in line with the pointer 38 for magnifying the readings with respect to the pointer 38 on the scale 37. Likewise a vernier adjustment of the two pointers relative to each other may be made by rotating the sleeve 47 with respect to the sleeve 40 by grasping the enlargement 57 thereon. This vernier adjustment serves to correct for the meniscus formed in the upper surface of the liquid in the bottle and in the small tube 36'. Because the shape of the meniscus formed differs with the size of the neck of the bottle, a slight adjustment by means of the rotation of sleeve 47 may be made to fill the bottle to the height of the pointer 38.

Since the sleeve 47 mounting the pipes 27' and 34' slides freely on the pedestal 41, the pipes may be raised for removing and replacing a bottle and when the sleeve 47 is lowered, it will be stopped by the sleeve 53 on pedestal 41 engaging its lower end and held accurately in position. Hence the raising or lowering of the sleeve 47 and the pipes does not disturb the adjustment.

The height scale 37 is attached to a sleeve 60 held in position by a set screw 61. The sleeve 60 has an extension 62 which supports the latch member 24 together with the height scale 37, hence since the latch member 24 determines the position of the bottom of the bottle, the scale is always accurately in position and reads correctly by means of pointer 38 the proper height of the liquid in the bottle. The pointer 38 furnishes a visual indication of the proper height of the liquid in the bottle as illustrated in Fig. 1.

In the operation of the complete device, referring more particularly to Fig. 1, the sleeve 47 is raised, a bottle 8 removed from the scales and another inserted. The sleeve 47 may then be dropped in position. In view of the fact that its lower movement is limited, its lower position will be definitely determined by the position of the sleeve 52. If the mechanism has not already been adjusted, then the sleeve 49 will be raised until the pointer 38 reads approximately at the proper height which it is desired to fill the container. Then the final vernier adjustment of the pointer 38 is obtained by rotating the member 52. The mechanism is then ready for continuous testing of the particular type of bottle for which adjustment has been made. The latch 24 is released and the bottle is weighed by placing an avoirdupois weight 6 on the platform 5 and by taking the reading with the scale pointer 10. When the pointer comes to rest indicating the weight of the empty bottle, the knob 16 is utilized to move the auxiliary fluid scale 14 until its zero point registers with the pointer 10, thus giving a zero reading on the fluid scale. The platform 7 is then moved down and locked in position by the latch 24. The valve 30' is opened by pressing down the handle 30'' thereof which supplies water through the pipe 29', hose 29a and pipe 27' into the bottle. When the bottle is filled to about the point indicated in dotted lines in Fig. 1, which is above the desired height, the lever 30'' is released closing the valve 30'. The valve 31 to the drain is preferably already slightly open, hence when the valve 30' is closed, the valve 31 begins to drain the water out of the hose 29a through pipe 29b, which forms a siphon drawing the excess water out of the bottle, thus lowering the liquid level from the dotted position to the full line position shown in Fig. 1. As the level of the water reaches the bottom end 28' of pipe 27', the large pipe 27' ceases to function as a siphon. However, the small pipe 34' within the large pipe continues to function as a siphon until the level of the water is below its lower end 36'. Thus the withdrawal of the liquid from the container is automatically stopped when the level has reached the proper height in the bottle as shown in Fig. 1.

After filling the bottle with liquid as described above, a suitable weight 17 showing fluid ounces of the liquid is placed on the platform 5 and a reading taken on the auxiliary scale 14. The zero point of the scale 14 was aligned with the pointer 10 at the completion of the weighing of the container as described hereinbefore; hence the reading on the scale 14 added to or subtracted from the weight 17 will give the actual fluid ounces of water in the bottle thereby completing the weight testing.

It will be seen that the present invention provides a simple and effective mechanism for weighing containers to determine the weight of the containers in avoirdupois ounces when empty and to read the weight of the liquid therein in fluid ounces. The device also provides accurate, speedy and convenient means for filling a bottle to a predetermined level, which greatly facilitates the filling and testing operations. The filling mechanism may be readily adjusted for different heights of bottles and lends itself to use in glass factories where various types of bottles and containers are manufactured.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a device of the class described, the combination of a tube adapted to extend into a container, a swinging support for the container, a latch for said support, means for delivering liquid to said tube for filling the container, an independent standard holding said delivery means, a tube for siphoning excess liquid from said container and carried on said standard, and a scale carried on said latch for determining the distance the end of the siphon tube is above the bottom of the container.

2. In a device of the class described, the combination of a tube adapted to extend into a container, a swinging support for the container, a latch for said support, means for delivering liquid to said tube for filling the container, an independent standard holding said delivery means, a tube for siphoning excess liquid from said container and carried on said standard, a scale carried on said latch for determining the distance the end of the siphoning tube is above the bottom of the container, and an adjustable pointer on the standard extending across said scale to said container to determine the height of the liquid in the container.

3. In a device of the class described, the combination of a tube adapted to extend into a container, a swinging support for the container, a latch for said support, means for delivering liquid to said tube for filling the container, an independent standard holding said delivery means, a tube for siphoning excess liquid from said container and carried on said standard, a scale carried on said latch for determining the distance the end of the siphoning tube is above the bottom of the container, a pointer on the standard extending across said scale to said container to determine the height of the liquid in the container, a second pointer in operative relation to said scale for determining the height of the end of said siphoning tube above the bottom of the container, and means for independently adjusting the pointers along the scale.

4. In a device of the class described, the combination of a tube adapted to extend into a container, a swinging support for the container, a latch for said support, means for delivering liquid to said tube for filling the container, an independent standard holding said delivery means, a tube for siphoning excess liquid from said container and carried on said standard, a scale carried on said latch for determining the distance the end of the siphoning tube is above the bottom of the container, a pointer on the standard extending across said scale to said container to determine the height of the liquid in the container, a second pointer in operative relation to said scale for determining the height of the end of said siphoning tube above the bottom of the container, the said pointers being adjustable with respect to each other, a slidable mount carrying the tubes and pointers and slidable on the standard.

5. The combination with a balance having a platform, of a scale and pointer for indicating on the scale small fractions of the weight of a container on the platform, a device settable for holding the platform against movement, means for filling the container on the platform to an indicated point, a second pointer indicating said point, and a second scale settable along the travel of the first pointer and graduated to indicate in volume units by deviations of said first pointer, small fractions of the material filled into the container to bring its contents to said indicated point.

6. The combination with a balance having a platform, of a scale and pointer for indicaing on the scale small fractions of the weight of a container on the platform, a device settable to hold the platform against movement, a second pointer, a siphon including a rapid flow tube for rapidly filling and partly emptying the container with liquid, a smaller tube for slowly siphoning off liquid after a first portion of liquid has been rapidly siphoned off, means for setting the smaller tube to a height to correspond with said second pointer, and a second scale graduated to show small volumes of liquid in the container and settable along the travel of the first pointer to show by said first pointer said volume of liquid.

7. The combination with a balance having a platform, of a scale, a pointer for indicating on the scale small fractions of weight on the platform, a device settable for holding the platform against movement, a siphon tube having a connection for supplying water to a bottle on the platform, a run-off tube adapted to automatically draw off rapidly the major part of excess water by the siphon when the supply connection is closed and a small siphon tube adapted to slowly draw off the last part of the excess water.

8. The combination with a balance having a platform, of a scale, a pointer for indicating on the scale small fractions of weight on the platform, a device settable for holding the platform against movement, a siphon tube having a connection for supplying water to a bottle on the platform, a rapid run-off tube adapted to automatically draw off excess water by the siphon when the supply connection is closed, and a slow run-off tube within the siphon tube adapted to draw off water slowly after the rapid tube ceases to draw off water to effect accurate measurement of water.

9. The combination with a balance having a platform, of a scale, a pointer for indicating on the scale small fractions of weight on the platform, a siphon tube having a connection for supplying water to a bottle on the platform, a second scale adapted to indicate water supplied to the bottle and settable along the travel of said pointer so that the pointer indicates the water supplied, and a device settable for holding the platform against movement where the siphon tube supplies water.

10. The combination with a balance having a platform, of a scale, a pointer for indicating on the scale small fractions of weight on the platform, a device settable for holding the platform against movement, a siphon tube having a connection for supplying water to a bottle on the platform, a second scale adapted to indicate water supplied to the bottle and settable along the travel of said pointer so that the pointer indicates the water supplied, and a slow run-off tube within the siphon tube adapted to draw off water to effect accurate measurement of water.

11. In a device for filling a container to a given height, the combination with a siphon tube extending into the container and terminating above said height, means for delivering a liquid to said tube to fill the container to said height through it, a smaller siphon tube having one end extending into the container slightly below the end of the first mentioned tube and at said height, and connections to said tubes whereby shutting off the delivering means causes any liquid in the first mentioned tube to siphon liquid out of the container through both tubes so that liquid is siphoned out rapidly until the liquid level falls below the end of the first mentioned tube and then is siphoned out slowly through the smaller tube until the liquid level falls below the end of the smaller tube.

12. In a device for filling a container to a given height, the combination of a siphon tube extending into the container and terminating a little above said height, means for delivering a liquid to said tube to fill the container to said height through it, a smaller siphon tube extending into the container to slightly below the end of the first mentioned tube and at said height and having its opposite end within the first mentioned tube, and connections whereby shutting off the delivery means causes any liquid in the first mentioned tube to siphon off liquid out of the container so that the liquid is siphoned off rapidly through both tubes until the liquid level falls below the end of the first mentioned tube and then is siphoned out slowly through the smaller tube until the liquid level falls below the end of the smaller tube.

GEORGE P. NAIRN.